Patented Apr. 16, 1940

2,197,021

UNITED STATES PATENT OFFICE 2,197,021

PREPARATION OF D-TARTARIC ACID

Richard Pasternack, Brooklyn, and Ellis V. Brown, Jamaica, N. Y., assignors to Charles Pfizer & Company, Brooklyn, N. Y., a corporation of New Jersey No Drawing. Application December 13, 1938, Serial No. 245,420

3 Claims. (Cl. 260—536)

This invention relates to the preparation of d-tartaric acid and has for its object to provide an improved, economical process for this purpose.

Many attempts have been made to prepare d-tartaric acid by the oxidation of carbohydrate material. All of the published processes produce a mixture of isomers and by-products from which separation of the d-tartaric acid is commercially impracticable.

Ellis, in U. S. Patent 789,269 (1905), describes anodic oxidation of "saccharine matters" (citing grape sugar as an example) to produce a mixture of organic acids including tartaric acid. The Diamalt A. G. of Munich, Germany, beginning in 1918 patented processes for preparing tartaric acid from saccharic acid or from glucose, oxidized by an electric current or by peroxides in the presence of organic catalysts. Odell in U. S. Patent 1,425,605 (1922) discloses the nitric acid oxidation of "a carbohydrate or saccharid" in the presence of "metalliferous catalysers" to produce "a solution containing oxalic acid, tartaric acid, saccharic acid, and perhaps—other organic acids."

Milas and Terry (J. Am. Chem. Soc. 47:1412-8, 1925) have described the oxidation of fumaric to racemic tartaric acid by means of potassium chlorate in the presence of an osmium oxide catalyst, Zemplen (U. S. Patent 1,605,419), Henzerling (U. S. Patent 1,834,057) and Stokes (U. S. Patent 1,870,472) describe other methods of oxidizing fumaric acid, starch, etc., to racemic tartaric acid. None of these processes, in so far as we have been able to determine, has been commercially successful, apparently because of the difficulty of separating the isomers and the lack of any substantial market for the isomers of d-tartaric acid.

W. E. Barch (J. Am. Chem. Soc. 55:3653-3658, 1933) describes the oxidation of 5-keto-d-gluconic acid with nitric acid in the presence of vanadium. He apparently had no conception of the possibility of obtaining d-tartaric acid free from isomers. Barch obtained only a mixture of organic acids primarily consisting of trihydroxy glutaric acid and the tartaric isomers. Such a mixture is not a practical source of d-tartaric acid.

However, we have now found that on account of the favorable structure of 5-keto-d-gluconic acid, it is possible by a suitable selection of oxidizing agent to prepare from it d-tartaric acid substantially free from isomers and with no by-products which are worthless or difficult to remove. The calcium salt of 5-keto-d-gluconic acid is obtainable by biological methods [Boutroux (Compt. rend. 127:1224), Bernhauer (Biochemische Zeitschrift 280:367–72), and Kluyver (Rec. trav. chim. Pays-Bas 57:609–15)]; also by chemical oxidation [Kiliani (Berichte 55B:75–101) or Hart (J. Biol. Chem. 123:liii)].

Formation of d-tartaric acid free of isomers may take place either under acid or under alkaline conditions, using oxygen-containing gases with or without catalysts. The temperature is not critical, except that as the 5-keto acid is considerably decomposed at temperatures above 80° C. we prefer to work at more moderate temperatures.

For the following examples a solution of free 5-keto-gluconic acid was prepared by treating an aqueous suspension of the calcium salt with a sufficient excess of sulphuric acid to decompose it completely. The resulting acid solution can be used directly or the excess sulphuric acid can be removed with barium carbonate.

*Example 1.*—Potassium 5-keto gluconate is produced by treating 90 grams potassium carbonate in 2½ liters twice normal potassium hydroxide solution with 334 grams calcium 5-keto-d-gluconate trihydrate. At 40° C. a finely dispersed stream of oxygen is passed thru the mixture. The reaction is complete when the test with Fehling's solution is negative. This takes about 4 hours.

The calcium carbonate is removed by filtration and the filtrate adjusted to pH 3.5 with acetic acid. A crude acid potassium tartrate containing some acid potassium oxalate precipitates and is separated by filtration. It can be purified by any of the known methods, for instance by fractional recrystallization from water.

*Example 2.*—This process is the same as that of Example 1 except that 10 grams of vanadium pentoxide are added and the temperature is held between 60 and 70° C. during the oxidation which takes about four hours. Contamination with oxalate is even less than in Example 1.

*Example 3.*—An aqueous solution containing 300 grams of 5-keto-d-gluconic acid is diluted to a volume of two liters. To this is added 10 grams vanadium pentoxide, and finely dispersed oxygen is passed through at 50°. After about eight hours the reaction is practically complete. The tartaric acid is recovered in the form of potassium acid tartrate as in the previous examples.

*Example 4.*—An aqueous solution of 208 grams of 5-keto-d-gluconic acid is treated with four moles of nitric acid and 10 grams of manganese dioxide. The mixture is diluted to a volume of two liters and finely dispersed oxygen is passed through for seven hours while the whole is maintained at a temperature of 70° C. The solution is brought to a pH of 3.5 with potassium carbonate to precipitate acid potassium tartrate, which in this case is substantially free from oxalate. Under the conditions of this experiment cobalt, vanadium and titanium give equally good yields, while molybdenum, chromium, iron, cerium, nickel, uranium and tungsten all catalyze the action but do not act as efficiently as manganese. The nitric acid is present only for the purpose of adjusting the pH. Under the conditions given it does not contribute to the oxidation in any substantial degree.

The invention claimed is:

1. Process for producing d-tartaric acid which comprises oxidizing a member selected from the group consisting of 5-keto-d-gluconic acid and its salts by the action of an oxygen-containing gas at a pH between 0.1 and 14.

2. Process for producing d-tartaric acid which comprises oxidizing a member selected from the group consisting of 5-keto-d-gluconic acid and its salts by means of a finely dispersed oxygen-containing gas in the presence of a catalyst selected from the group consisting of vanadium, cobalt, manganese, titanium, molybdenum, chromium, iron, cerium, nickel, uranium and tungsten, at a pH range between 0.1 and 14.

3. Process for producing d-tartaric acid which comprises oxidizing a member selected from the group consisting of 5-keto-d-gluconic acid and its salts by means of a finely dispersed oxygen-containing gas in the presence of manganese as a catalyst.

RICHARD PASTERNACK.
ELLIS V. BROWN.